United States Patent [19]
Omoto et al.

[11] Patent Number: 6,075,919
[45] Date of Patent: Jun. 13, 2000

[54] VIDEO-SIGNAL PLAYBACK APPARATUS AND ITS OPERATION CONTROL METHOD

[75] Inventors: Takeshi Omoto, Chiba; Noboru Motoyoshi; Toshiyuki Katsumoto, both of Tokyo, all of Japan

[73] Assignee: Sony Corporation, Tokyo, Japan

[21] Appl. No.: 08/889,984

[22] Filed: Jul. 10, 1997

[30] Foreign Application Priority Data

Jul. 23, 1996 [JP] Japan ................................ 8-211966

[51] Int. Cl.$^7$ .................................................. H04N 5/783
[52] U.S. Cl. .............................................. 386/68; 386/81
[58] Field of Search ................................. 386/81, 68, 45, 386/125, 126, 46; 360/71, 72.1, 73.1, 73.04, 10.1

[56] References Cited

U.S. PATENT DOCUMENTS

| | | | |
|---|---|---|---|
| 5,426,534 | 6/1995 | Nakata et al. ............................. | 360/71 |
| 5,526,125 | 6/1996 | Mori et al. .............................. | 360/10.1 |
| 5,541,737 | 7/1996 | Oguro et al. ........................... | 360/72.1 |

*Primary Examiner*—Wendy Garber
*Assistant Examiner*—Thanh J. Pham
*Attorney, Agent, or Firm*—Frommer Lawrence & Haug, LLP.; William S. Frommer

[57] ABSTRACT

The present invention provides a video-signal playback apparatus that allows the user to carry out cue and review operations by pressing only one operation button (a skip button) and to set the length of a review time at a value desired by the user. While watching a program in a normal playback state, the user can press the skip button once in order to put the VCR in a skip-cue state. As a point of interest has been reached, the skip button is pressed for the second time to make the VCR transit from the skip-cue state to a skip-review state. After the review operation has been carried out for a predetermined period of time, the VCR gets in a normal playback state automatically. If the skip button is pressed for the second time continuously instead of momentarily, the review operation is continued as long as the skip button is being pressed. As the skip button is released, the review operation is discontinued, putting back the VCR in a normal playback state. By the way, the predetermined period of time can be changed by the user as the user likes.

6 Claims, 6 Drawing Sheets

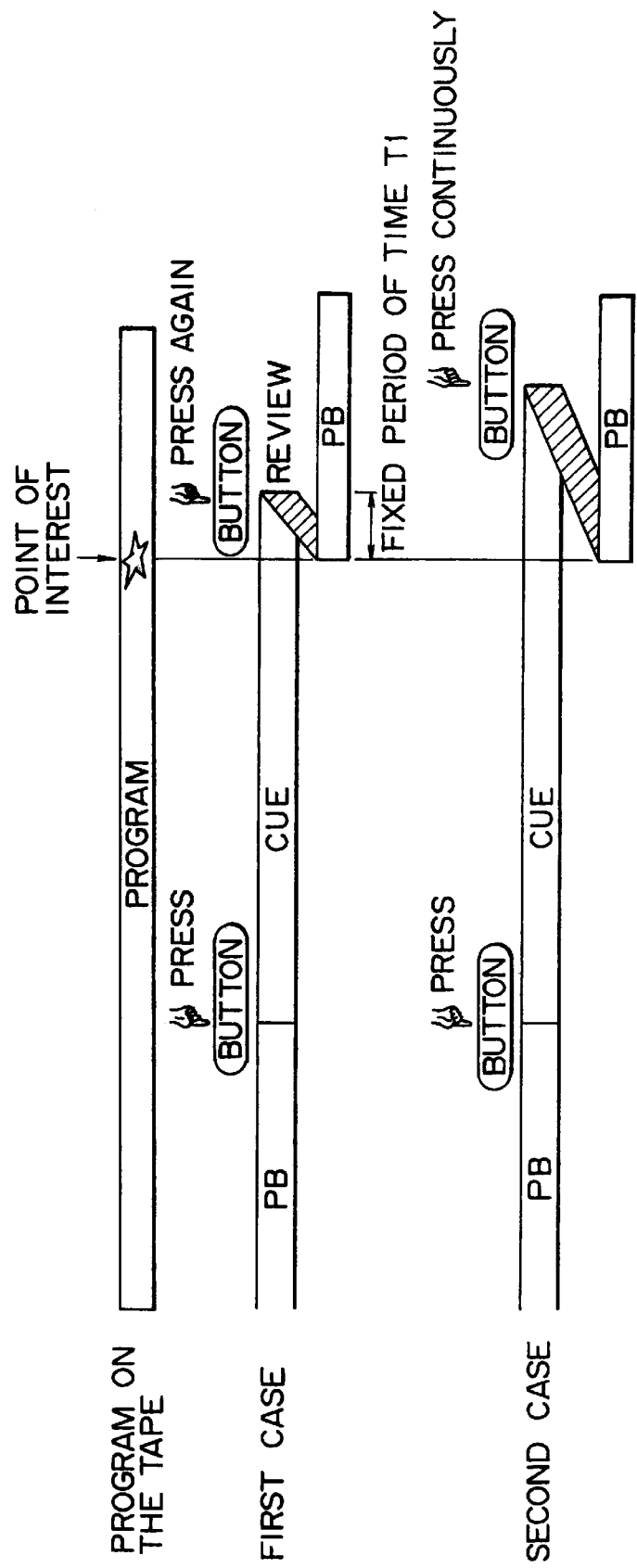

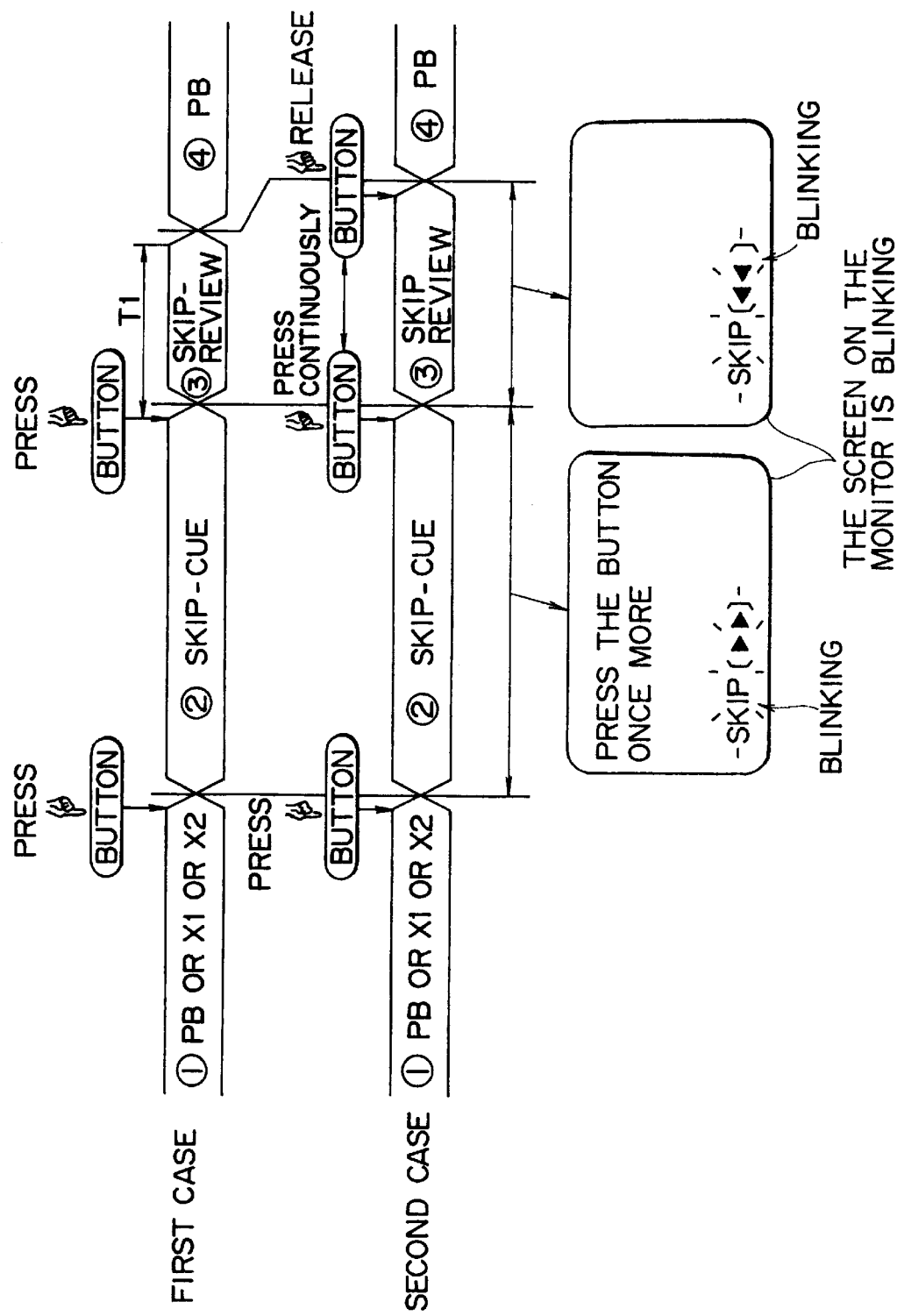

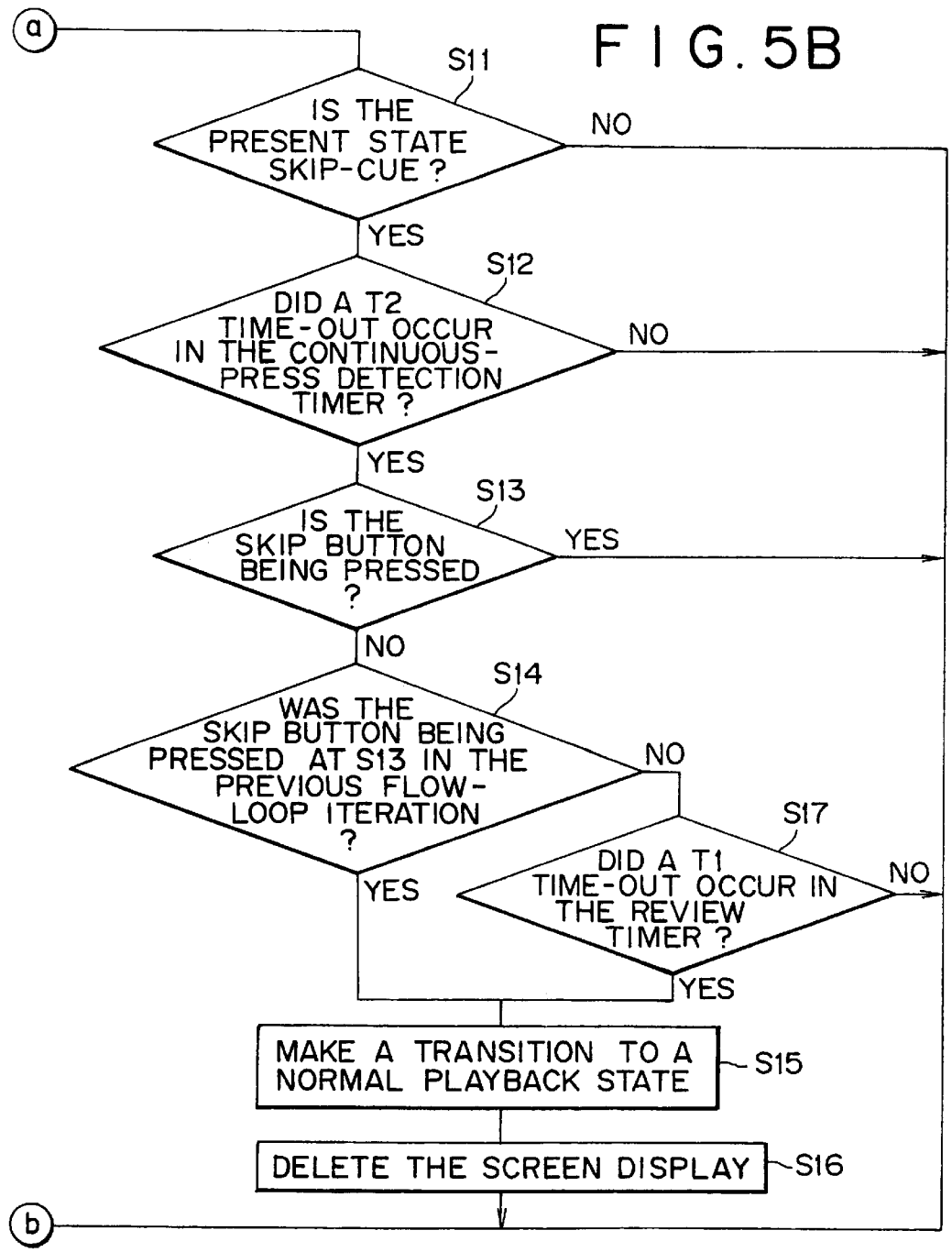
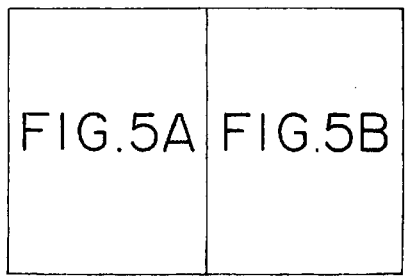
FIG. 5

VIDEO-SIGNAL PLAYBACK APPARATUS AND ITS OPERATION CONTROL METHOD

BACKGROUND OF THE INVENTION

The present invention relates to an apparatus for playing back a video signal such as a video cassette recorder (hereinafter, referred to simply as a VCR), and particularly to a technique for searching a recording medium, normally a magnetic recording tape, for a point of interest on the downstream side of the present point in a playback operation.

When the user plays back a program of a television broadcast recorded in a VCR and takes enjoyment in it, in some cases, the user searches the recording medium for a point of interest on the downstream side of the present position at a high speed in a playback operation in order to play back the program starting from the point of interest. Such a search is done for example to watch the program by skipping commercials or the user wants to search the program for a goal scene in a soccer game.

The operation to search the recording medium for a point of interest is carried out by first continuously pressing a cue (fast playback) button and then, when the point of interest has been reached, releasing the cue button. At that time, since the point searched for is usually passed, a review (rewind-playback) button is pressed continuously till a point before the searched point is reached. At this point, the review button is released to get in a PB (normal playback) state in which the program is reproduced starting from the point of interest.

As another technique for carrying out an operation to search the recording medium for a point of interest, a VCR may be provided with a skip button. Pressing the skip button will put the VCR in a cue state and pressing the skip button for a second time will allow a program to be reviewed for a fixed period of time. In the case of such a VCR, the user presses the skip button once to put the VCR in a skip-cue state then, as the point being searched for has been reached, the skip button is pressed for a second time to review the program. In this way, a point of interest can be played back.

In the technique of operation pressing the cue and review buttons one after another, it is necessary to operate the two buttons. In order to press one of the buttons, it is necessary for the user to look at the button. As a result, it is difficult for the user to concentrate the attention thereof on a point being searched for.

In the technique of operation pressing only the skip button twice, on the other hand, the length of the time for reviewing a program is fixed. As a result, it is impossible to set a period of review time desired by the user.

OBJECT AND SUMMARY OF THE INVENTION

An object of the present invention is to provide a video-signal playback apparatus which is capable of carrying out cue and review operations when the user merely presses a single operation button and allows the user to set the length of a review time as the user likes, and to provide an operation control method of the video-signal playback apparatus.

To achieve the above object, according to a first aspect of the present invention, there is provided a video-signal playback apparatus including: a driving means for driving a magnetic tape; an operation member; and a system controller including a first detection means for setting the length of a review time, and a second detection means for measuring an actual length of an operation time during which the operation member is being operated in a skip-review state; wherein a first transition occurs from the normal playback state to a skip-cue state when the operation member is operated in a normal playback state; a second transition occurs from the skip-cue state to the skip-review state when the operation member is operated for the second time in the skip-cue state; the skip-review state continues for the review time, the length of which is set in the first detection means, being followed by a third transition from the skip-review state back to the normal playback state if the actual length of the operation time of the operation member measured by the second detection member in the skip-review state is shorter than a predetermined period of time set in the second detection means; and the skip-review state continues as long as the operation member is being pressed, being followed by the third transition from the skip-review state back to the normal playback state if the actual length of the operation time of the operation member measured by the second detection member in the skip-review state is equal to or longer than the predetermined period of time set in the second detection means.

The predetermined length of the review time set in the first detection means is preferably varied in accordance with a recording mode.

The second detection means preferably measures the actual length of the operation time of the operation member by detecting a control signal played back by the magnetic tape.

The predetermined period of time set in the second detection means can be preferably varied.

The system controller preferably has a display control means for displaying a screen showing a review state in a reversed direction in the skip-review state.

According to a second aspect of the present invention, there is provided a method for playing back a video signal including the steps of: making a first transition from a normal playback state to a skip-cue state when an operation member is operated in the normal playback state; making a second transition from the skip-cue state to a skip-review state when the operation member is operated for the second time in the skip-cue state; letting the skip-review state continue for a second predetermined period of time, being followed by a third transition from the skip-review state back to the normal playback state if the length of an operation time of the operation member in the skip-review state is shorter than a first predetermined period of time; and letting the skip-review state continue as long as the operation member is being operated, being followed by the third transition from the skip-review state back to the normal playback state if the length of the operation time of the operation member in the skip-review state is equal to or longer than the first predetermined period of time.

According to the video-signal playback apparatus provided by the present invention, as described above, first of all, when the user operates a skip operation member while watching a program in a normal playback state, the tape driving means gets in a skip-cue state. The user then looks at a video screen played back in the skip-cue state and as a point of interest has been reached, the skip operation member is operated for the second time, causing the tape driving means to transit from the skip-cue state to a skip-review state. If the operation time of the skip operation member in the skip-review state is shorter than a first predetermined period of time, the skip-review state continues for a second predetermined period of time, being followed by a transition of the tape driving means from the skip-review state back to the normal playback state. If the operation time of the skip operation member in the skip-review state is equal to or longer than the first predetermined period of time, on the other hand, the skip-review state continues as long as the skip operation member is being operated, being followed by the transition of the tape driving means from the skip-review state back to the normal playback state.

It should be noted that the video-signal playback apparatus according to the present invention is an apparatus having at least a function for playing back a video signal. Thus, the video-playback apparatus includes a video tape recorder which has a function for recording and playing back both video and audio signals.

As described in detail above, according to the present invention, only one skip operation member allows the tape driving mechanism to be put in a skip-cue or skip-review state.

In addition, the length of the review time can be set at a value desired by the user. If the length of review time is set at a value in an SP mode, for example, the value is automatically adjusted to such a value for another mode that the amount of rewind becomes equivalent to that for the SP mode.

On the top of that, by continuously operating the skip operation member for the second time for a period of time exceeding a predetermined value, the length of the review time can be set at an arbitrary value.

As a result, a commercial can be skipped and the tape can be searched for a desired scene with ease.

BRIEF DESCRIPTION OF THE DRAWINGS

These and other objects of the invention will be seen by reference to the description, taken in connection with the accompanying drawings, in which:

FIG. 3 is a diagram showing an outline of a skip-search operation carried out by the VCR shown in FIG. 1 for first and second cases;

FIG. 4 is a timing diagram showing a comparison of the first case with the second case shown in FIG. 3.

DETAILED DESCRIPTION OF THE PREFERRED EMBODIMENT

Hereinafter, one preferred embodiment of the present invention will be described with reference to the accompanying drawings.

Figure 1:
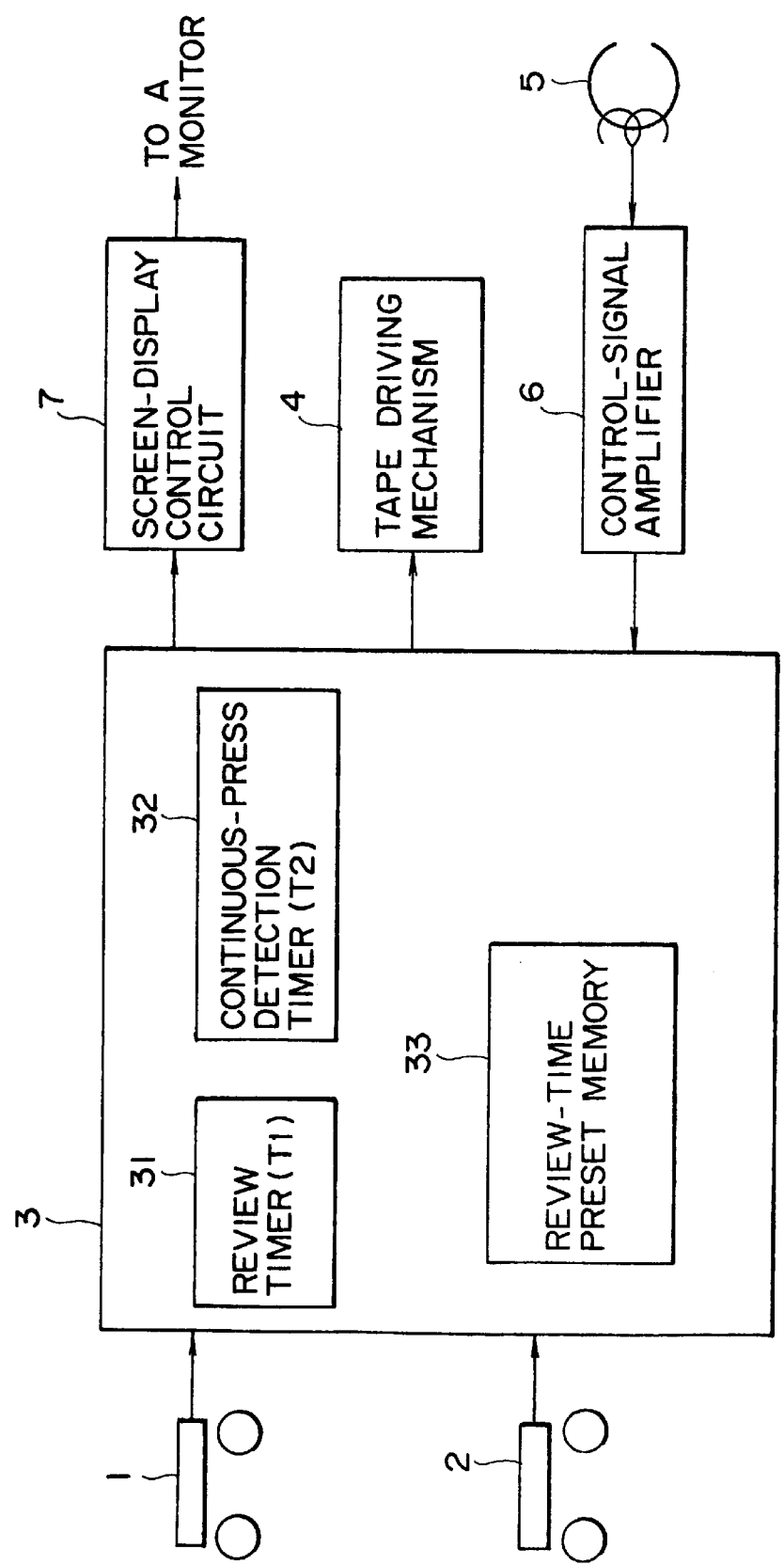
FIG. 1 is a block diagram showing the configuration of elements composing a VCR to which the present invention is applied.

FIG. 1 is a block diagram showing the configuration of elements composing a VCR to which the present invention is applied.

As shown in the figure, the VCR is provided with a skip button 1 and a preset-value setting button 2. The skip button 1 and the preset-value setting button 2 are provided on an operation panel of the cabinet of the VCR as well as on a remote commander both of which are not shown in the figure.

The VCR shown in the figure includes a system controller 3, a tape driving mechanism 4 controlled by the system controller 3, a control head 5 for playing back a control signal from a magnetic tape driven by the tape driving mechanism 4, a control-signal amplifier 6 for amplifying the control signal played back by the control head 5 and a screen-display control circuit 7 also controlled by the system controller 3. It should be noted that the magnetic tape is not shown in the figure. The status of the skip button 1 and the preset-value setting button 2 as well as the output of the control-signal amplifier 6 are supplied to the system controller 3. On the other hand, the output of the screen-display control circuit 7 is supplied to a monitor, typically a television receiver, connected to the VCR. It is worth noting that a block for playing back a video signal recorded on the magnetic tape and transmitting the reproduced video signal to the monitor is not shown in the figure.

Implemented by a microcomputer, the system controller 3 includes a review timer 31, a continuous-press detection timer 32 and a review-time preset memory unit 33.

When the skip button 1 is pressed while the tape driving mechanism 4 is operating in a skip-cue state, the review timer 31 is set at a predetermined period of time T1. As the predetermined period of time T1 lapses since the setting of the review timer 31, a time-out occurs in the review timer 31. Such a time-out is also referred to hereinafter as a T1 time-out.

On the other hand, the continuous-press detection timer 32 is set at a predetermined time T2 of typically 0.5 seconds immediately after the tape driving mechanism 4 of the VCR gets in a skip-review state. As the predetermined time T2 lapses since the setting of the continuous-press detection timer 32, a time-out is the to occur in the continuous-press detection timer 32. Such a time-out is also referred to hereafter as a T2 time-out.

The review-time preset memory unit 33 records the length of the review time T1 which is set by the user by pressing the preset-value setting button 2.

Figure 2A:
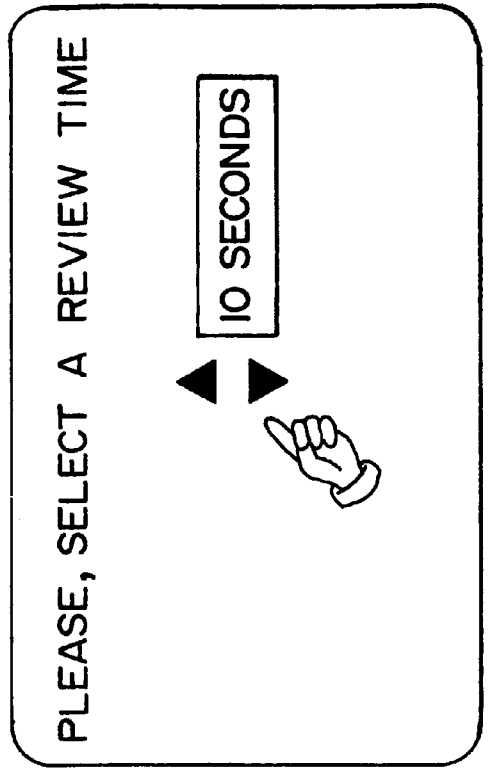
FIGS. 2A and 2B are diagrams each showing an example of a menu screen displayed on a monitor to request the user to set the length of a review time by pressing the preset-value setting button.
Figure 2B:
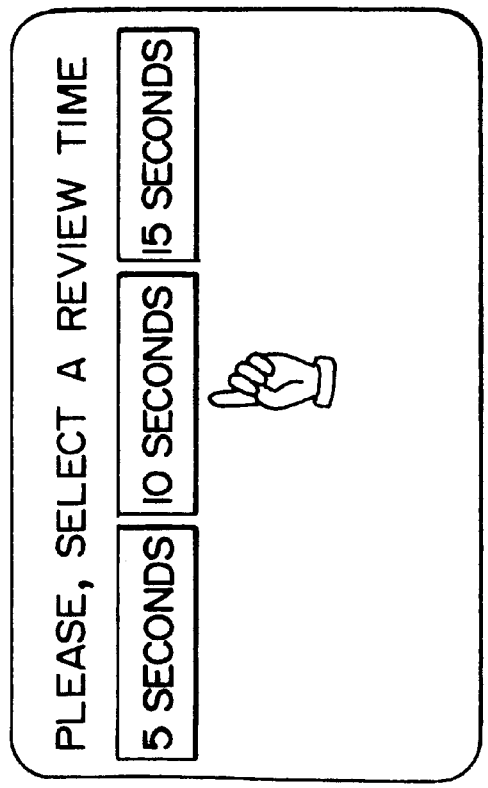

FIGS. 2A and 2B are diagrams each showing an example of a menu screen displayed on the monitor to request the user to set the length of the review time T1 by pressing the preset-value setting button 2. A signal for displaying such a screen is created by the system controller 3 in conjunction with the screen-display control circuit 7 and supplied to the monitor. The menu screen shown in FIG. 2A lets the user select 5, 10 or 15 seconds as the length of the review time T1. On the other hand, the menu screen shown in FIG. 2B allows the user to change the length of the review time T1 being set in 1-second units. Typically, the review time T1 is expressed in terms of pulses of the control signal. For example, if a pulse of the control signal is generated for each frame which is 1/30 seconds in length in the case of the NTSC system, a review time T1 of 10 seconds corresponds to 300 pulses. As such, a review time T1 is set at a value representing a pulse count of the control signal. By setting a review time T1 at a value representing a pulse count of the control signal in this way, an operation to review of the tape can be carried out over a fixed length regardless of whether the VCR was put in the SP, LP or EP recording mode even if the speed of the tape during the review time T1 is set at a fixed value independent of the recording modes because the set value of the review time T1 is adjusted in dependence upon the recording mode as will be described later.

FIG. 3 is a diagram showing an outline of a skip-search operation carried out by the VCR shown in FIG. 1 for first and second cases.

First of all, the first case is explained. In this case, watching a program in a normal playback state, the user presses the skip button once to put the tape driving mechanism 4 in a skip-cue state, a cue state resulting from the operation of the skip button. The user is then looking at the screen. As a point of interest has been reached, the user presses the skip button for the second time, causing the tape driving mechanism 4 to transit from the skip-cue state to a skip-review state, a review state resulting from the operation of the skip button. After a fixed period of time T1 has lapsed since the start of the skip-review state, the tape driving mechanism 4 automatically enters a normal playback state again. As a result, the user can watch the program starting from the point of interest or a point on the upstream side slightly ahead of the point of interest.

Next, the second case is explained. In the second case, operations up to the pressing of the skip button for the second time are the same as those of the first case. The second case is different from the first case in that, when operating the skip button for the second time in the second case, however, the user is continuously pressing the skip button. A skip-review operation is continued as long as the skip button is being pressed. As a point of interest has been reached, the user releases the skip button to discontinue the skip-review operation. Since the tape driving mechanism 4 then gets in a normal playback state again, the user can watch the program starting from the point of interest or a point on the upstream side slightly ahead of the point of interest.

Next, operating modes of the VCR shown in FIG. 1 are explained in detail. FIG. 4 is a timing diagram showing a comparison of the first case with the second case shown in FIG. 3.

First of all, during a period of time shown by the period ① in FIG. 4, the VCR is set in a variable-speed normal playback state at a one-time (×1) or two-time (×2) speed. Then, the skip button 1 is pressed. The operation to press the skip button 1 is detected by the system controller 3. The system controller 3 puts the tape driving mechanism 4 in a skip-cue state at the start of a period of time shown by the period ② in the figure. The skip-cue state is a cue state set as a result of pressing of the skip button 1 by the user once.

In the skip-cue state, the system controller 3 controls the tape driving mechanism 4 into a fast-feed playback operation in the same way as if the VCR had got in a normal cue state as a result of pressing of an FF (fast-feed) button by the user in a normal playback state. In addition, the system controller 3 controls the screen-display circuit 7, requesting the screen-display circuit 7 to display characters and symbols indicating a skip state in the forward direction as well as a message urging the user to press the skip button once more on the screen of the monitor. The characters, symbols and message are mixed with a video signal reproduced from a magnetic tape and displayed on the same screen with pictures conveyed by the video signal.

The user is looking at the screen of the monitor. As a point of interest has been reached, the skip button 1 is pressed for the second time. Detecting the operation to press the skip button 1, the system controller 3 puts the tape driving mechanism 4 in a skip-review state at the start of a period of time shown by the period ③ in FIG. 4. The skip-review state means a review state set as a result of pressing the skip button 1 by the user.

In the skip-review state, the system controller 3 controls the tape driving mechanism 4 into a fast-feed review operation in the same way as if the VCR had got in a normal review state as a result of pressing of a REW (rewind) button by the user in a normal playback state. In addition, the system controller 3 controls the screen-display circuit 7, requesting the screen-display circuit 7 to display characters and symbols indicating a skip state in the reversed direction on the screen of the monitor.

The changes in state occurring up to this point in the first case are the same as those in the second case. Thereafter, the first and second cases are different from each other.

First of all, in the first case wherein the skip button 1 is released after being pressed before a T2 time-out occurs in the continuous-press detection timer 32, the tape driving mechanism 4 automatically transits from the skip-review state to the normal playback state as the review time T1 stored in the review-time preset memory unit 33 lapses.

It is obvious from FIGS. 2A and 2B that the review time T1 determines a pulse count of the control signal. To put it in detail, a pulse count of the control signal is set in dependence of the mode. For example, for a review time T1 of 15 seconds, the pulse count is set at 15×30 in an SP mode, 2×15×30 in an LP mode and 3×15×30 in an EP mode. It is thus necessary to identify what mode the program to be reviewed was recorded in. In order to identify the recording mode, in the skip-cue state, the period of the control signal played back by the control head 5 and amplified by the control-signal amplifier 6 is computed by the system controller 3 and the computed result is stored in an internal register which is not shown in the figure. The computed result stored in the internal register is updated with a new value from time to time. The recording mode is identified from a computed result which is stored in the internal register when the skip button 1 is pressed for the second time.

In the second case wherein the skip button 1 is still being pressed even after a T2 time-out has occurred in the continuous-press detection timer 32, the tape driving mechanism 4 remains in the skip-review state as long as the skip button 1 is being pressed, automatically transiting from the skip-review state to the normal playback state as the skip button 1 is released.

Figure 5A:
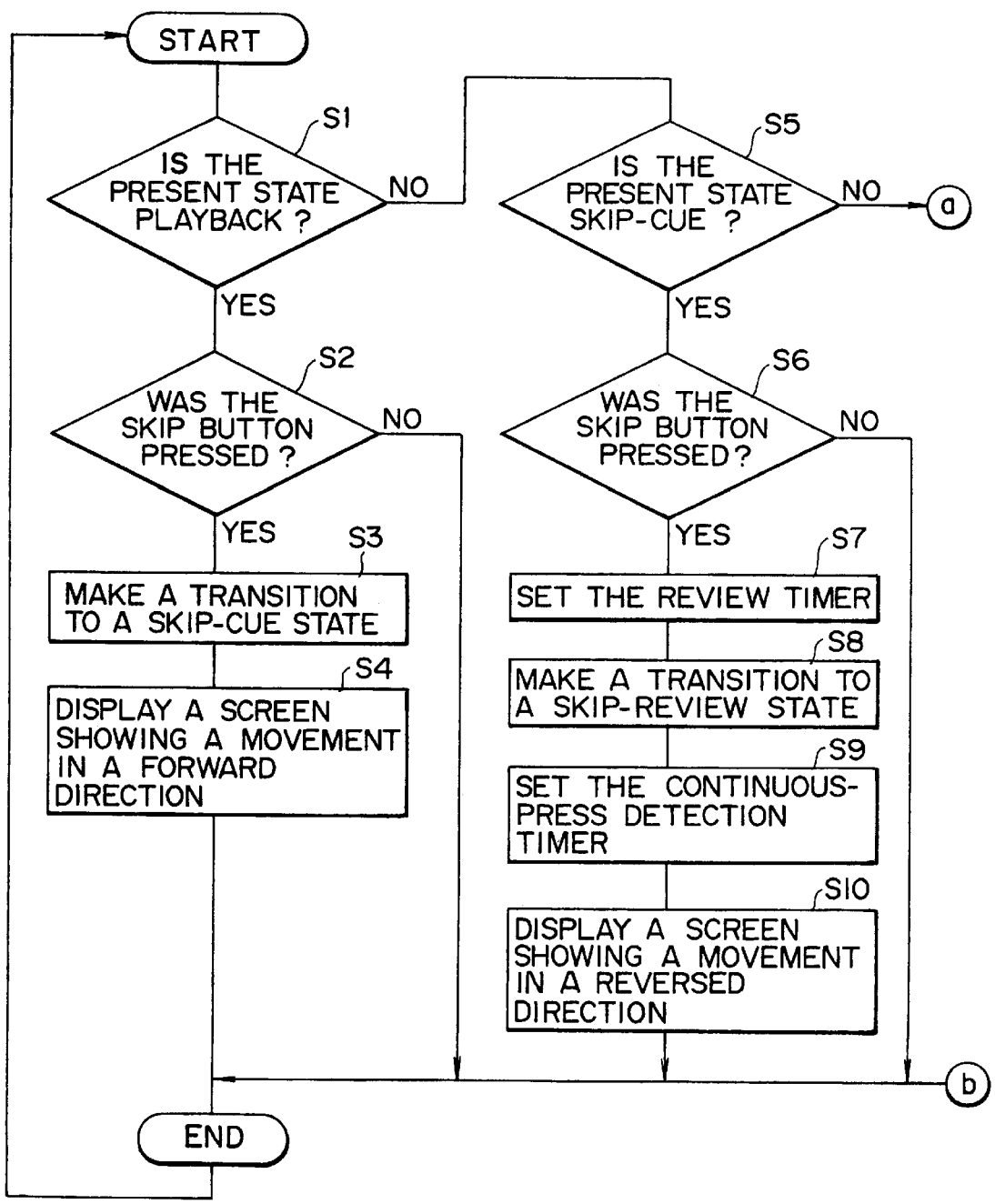
FIG. 5 is a diagram showing a flowchart illustrating processing carried out by a system controller employed in the VCR shown in FIG. 1 in order to implement the operations shown in FIG. 4.

FIG. 5 is a diagram showing a flowchart illustrating processing carried out by the system controller 3 in order to implement the operations shown in FIG. 4. The processing is repeated typically once every field period.

The flowchart begins with a step S1 to determine whether or not the tape driving mechanism is in a normal playback state at a one-time or two-time speed. If the tape driving mechanism is in a normal playback state, the processing flow proceeds to a step S2 to find our whether or not the skip button was pressed. If the skip button was not pressed, the processing flow returns to the step S1. If the skip button is found pressed at the step S2, on the other hand, the processing flow goes on to a step S3 at which the tape driving mechanism gets in a skip-cue state. Then, the processing flow continues to a step S4 at which a screen showing a movement in the forward direction shown in FIG. 4 is displayed. The processing carried out at the steps S1 to S4 corresponds to the periods of time shown by the periods ①, ② in FIG. 4 for both the first and second cases.

The processing flow then returns to the step S1. Since the tape driving mechanism got in a skip-cue state at the step S3, this time, the processing flow goes on from the step S1 to a step S6 by way of a step S5 to find out whether or not the skip button was pressed in the skip-cue state. If the skip button was not pressed in the skip-cue state, the processing flow returns to the step S1. If the skip button was found pressed in the skip-cue state at the step S6, on the other hand, the processing flow proceeds to a step S7 at which the review time T1 is set in the review timer. Then, the processing flow continues to a step S8 at which the tape driving mechanism gets in a skip-review state. It should be noted that, as described earlier, the review time T1 set in the review timer has a value which is determined in dependence on the recording mode identified in the skip-cue state. The processing flow then goes on to a step S9 at which the continuous-press detection timer is set. The processing flow then proceeds to a step S10 at which a screen showing a movement in the reversed direction shown in FIG. 4 is displayed. The processing carried out at the steps S5 to S10 corresponds to the periods of time shown by the periods ②, ③ in FIG. 4 for both the first and second cases.

The processing flow then returns to the step S1. Since the tape driving mechanism got in a skip-review state at the step S8, this time, the processing flow goes on from the step S1 to a step S12 by way of the step S5 and a step S11 to find out whether or not a T2 time-out has occurred in the continuous-press detection timer. If a T2 time-out has not occurred yet, the processing flow returns to the step S1. If a T2 time-out has occurred, on the other hand, the flow goes on to a step S13 to find out whether or not the skip button is being pressed. If the skip button is being pressed, that is, if the outcome of the step S13 is YES, the processing flow returns to the step S1. The flow from the step S13 to the step S1 corresponds to the second case in which the skip button is being pressed continuously.

If the skip button is not being pressed, that is, if the outcome of the step S13 is NO, on the other hand, the processing flow goes on to a step S14 to form a judgment as to whether or not the skip button was pressed continuously before, that is, whether or not the outcome of the judgment formed at the step S13 in the previous flow-loop iteration was YES. Assume that the outcome of the judgment formed at the step S14 indicates that the outcome of the judgment formed at the step S13 in the previous flow-loop iteration was YES. A YES outcome of the judgment made at the step S13 in the previous flow-loop iteration indicates that, in the previous flow-loop iteration, the skip button was still being pressed at the step S13 even after a T2 time-out was found to have occurred in the continuous-press detection timer at the step S12. This state corresponds to the second case in which the skip button has been released after being pressed continuously. In this state, the processing flow goes on to a step S15. Since the skip button is not being pressed now, at the step S15, the tape driving mechanism transits from the skip-review state to a normal playback state as indicated by the transition from the period ③ to the period ④ of the second case shown in FIG. 4. The flow further proceeds to a step S16 to erase the screen display showing the movement in the reversed direction.

If the outcome of the judgment formed at the step S14 indicates that the skip button was not being pressed, that is, if the outcome of the judgment formed at the step S13 in the previous flow-loop iteration was NO, on the other hand, the outcomes imply that, in the previous flow-loop iteration, the skip button was not being pressed after a T2 time-out had occurred in the continuous-press detection timer but the skip button was found once pressed at the step S6 before the T2 time-out occurred in the continuous-press detection timer. This state corresponds to the first case. In this state, the processing flow goes on to a step S17 to find out whether or not a T1 time-out has occurred in the review timer. If a T1 time-out has not occurred in the review timer, the processing flow returns to the step S1. If a T1 time-out has occurred in the review timer, on the other hand, the processing flow goes on to the step S15 at which the tape driving mechanism transits from the skip-review state to a normal playback state as indicated by the transition from the period ③ to the period ④ of the first case shown in FIG. 4. The flow further proceeds to the step S16 to erase the screen display showing the movement in the reversed direction.

It should be noted that, if the skip-cue or skip-review state has been continuing for a period time exceeding a predetermined value, time-out control can be carried out to terminate the skip-cue or skip-review state and restore the tape driving mechanism to the normal playback state or to put it in a halt state. The tape driving mechanism can also be put in a halt state when the top or the end of the tape is detected.

While the preferred embodiment of the present invention has been described using the specific terms, such description is for illustrative purposes only, and it is to be understood that changes and variations may be made without departing from the spirit or scope of the following claims.

What is claimed is:

1. A video-signal playback apparatus comprising:
    a driving means for driving a magnetic tape;
    an operation member; and
    a system controller including a first detection means for setting the length of a review time, and a second detection means for measuring an actual length of an operation time during which said operation member is being operated in a skip-review state;
    wherein a first transition occurs from a normal playback state to a skip-cue state when said operation member is operated in a normal playback state;
    a second transition occurs from said skip-cue state to said skip-review state when said operation member is operated for the second time in said skip-cue state;
    said skip-review state continues for said review time, the length of which is set in said first detection means, being followed by a third transition from said skip-review state back to said normal playback state if said actual length of said operation time of said operation member measured by said second detection means in said skip-review state is shorter than a predetermined period of time set in said second detection means; and
    said skip-review state continues as long as said operation member is being pressed, being followed by said third transition from said skip-review state back to said normal playback state if said actual length of said operation time of said operation member measured by said second detection member in said skip-review state is equal to or longer than said predetermined period of time set in said second detection means.

2. A video-signal playback apparatus according to claim 1 wherein said predetermined length of said review time set in said first detection means is varied in accordance with a recording mode.

3. A video-signal playback apparatus according to claim 1 wherein said second detection means measures said actual length of said operation time of said operation member by detecting a control signal played back by said magnetic tape.

4. A video-signal playback apparatus according to claim 1 wherein said predetermined period of time set in said second detection means can be varied.

5. A video-signal playback apparatus according to claim 1 wherein said system controller has a display control means for displaying a screen showing a review state in a reversed direction in said skip-review state.

6. A method for playing back a video signal comprising the steps of:
- making a first transition from a normal playback state to a skip-cue state when an operation member is operated in said normal playback state;
- making a second transition from said skip-cue state to a skip-review state when said operation member is operated for the second time in said skip-cue state;
- letting said skip-review state continue for a second predetermined period of time, being followed by a third transition from said skip-review state back to said normal playback state if the length of an operation time of said operation member in said skip-review state is shorter than a first predetermined period of time; and
- letting said skip-review state continue as long as said operation member is being operated, being followed by said third transition from said skip-review state back to said normal playback state if the length of said operation time of said operation member in said skip-review state is equal to or longer than said first predetermined period of time.

* * * * *